US005440529A

United States Patent [19]

Takezawa et al.

[11] Patent Number: 5,440,529
[45] Date of Patent: Aug. 8, 1995

[54] AUDIO AND GENERAL DIGITAL DATA RECORDING AND/OR REPRODUCING APPARATUS HAVING TWO INTERFACE CIRCUITS

[75] Inventors: Masayuki Takezawa, Tokyo; Yasuaki Maeda, Kanagawa, both of Japan

[73] Assignee: Sony Corporation, Tokyo, Japan

[21] Appl. No.: 194,402

[22] Filed: Feb. 10, 1994

[30] Foreign Application Priority Data

Feb. 24, 1993 [JP] Japan .................................. 5-059599

[51] Int. Cl.6 .......................... G11B 13/04; G11B 7/00
[52] U.S. Cl. .......................................... 369/13; 369/32; 369/47; 369/48
[58] Field of Search ........................ 369/13, 14, 32, 47, 369/48, 54, 124, 33

[56] References Cited

U.S. PATENT DOCUMENTS

| 5,214,631 | 5/1993 | Maeda et al. | 369/59 |
| 5,224,087 | 6/1993 | Maeda et al. | 369/54 |
| 5,243,588 | 9/1993 | Maeda et al. | 369/54 |

FOREIGN PATENT DOCUMENTS

0473305A1 3/1992 European Pat. Off. .
2212359 7/1989 United Kingdom .

*Primary Examiner*—Georgia Y. Epps
*Assistant Examiner*—Tan Dinh
*Attorney, Agent, or Firm*—Limbach & Limbach

[57] ABSTRACT

A digital recording and/or reproducing apparatus having a first interface circuit for inputting and outputting digital audio data and a second interface circuit for inputting and outputting general digital data. An input connector is provided for inputting both the digital audio data and the general digital data and an output connector is provided for outputting the digital audio data and the general digital data.

10 Claims, 4 Drawing Sheets

AUDIO AND GENERAL DIGITAL DATA RECORDING AND/OR REPRODUCING APPARATUS HAVING TWO INTERFACE CIRCUITS

BACKGROUND

1. Field of the Invention

The present invention relates to a digital recording and/or reproducing apparatus using a recording medium. More particularly, the present invention relates to such a digital recording and/or reproducing apparatus having an interface circuit.

2. Background of the Invention

An audio recording and/or reproducing apparatus using a compact size magneto-optical disc has already been proposed by the present assignee (e.g., EP-A-473305). In recording by the use of this recording and/or reproducing apparatus, digital audio data is compressed and the compressed digital data is recorded onto a compact size magneto-optical disc having a diameter of 64 (mm), for example. In reproducing by the use of this apparatus, the compressed digital data is read out from the magneto-optical disc and is once stored into a buffer memory. Then, the data is sequentially read out from the buffer memory and is then expanded to reproduce the original digital audio data.

In this case, the magneto-optical disc has a recording capacity of about 158 Mbytes and a maximum recording or reproducing time of about 74 (min).

As this recording and/or reproducing apparatus uses the compact size magneto-optical disc having a diameter of 64 (mm) as a recording medium, the apparatus can be reduced in size and weight, and accordingly it can be conveniently used as a portable recording and/or reproducing apparatus. Further, as the recording medium is in the form of a disc, the apparatus is excellent in random accessibility in such a manner that a desired piece of music can be instantaneously selected.

In the above-mentioned recording and/or reproducing apparatus, an audio signal is recorded or reproduced in the state of digital data. Accordingly, this apparatus is considered to be used also as an external storage for storing any digital data other than digital audio data, such as computer programs, document data, and image data. Thus, the recording and/or reproducing apparatus is considered to be used not only as audio equipment but also as an external storage for a computer or the like.

The use of the recording and/or reproducing apparatus also as an external storage brings about such a convenience that a user may listen to the music with this apparatus in the way to an office and may input data from this apparatus into a computer or gather data into the apparatus in the office.

However, in adding to the recording and/or reproducing apparatus the function as the external storage for storing general digital data excluding digital audio data, the apparatus must be additionally provided with an input connector and an output connector for the general digital data. The additional provision of such input and output connectors on the outer surface of the recording and/or reproducing apparatus having a compact size is difficult from a structural point of view, or is undesirable in design.

SUMMARY OF THE INVENTION

It is, therefore, an object of the present invention to provide a recording and/or reproducing apparatus using a recording medium, which resolves the above-mentioned problem.

According to the present invention, there is provided a digital recording and/or reproducing apparatus using a recording medium, including a first interface circuit for inputting and outputting digital audio data and a second interface circuit for inputting and outputting general digital data excluding the digital audio data. An input connector is provided for inputting the digital audio data and the general digital data. An output connector is provided for outputting the digital audio data and the general digital data, and a recording and/or reproducing device is provided for recording and/or reproducing the digital audio data and the general digital data. In recording the digital audio data, the digital audio data input from the input connector is supplied to the first interface circuit, and the digital audio data output from the first interface circuit is supplied to the recording and/or reproducing device and recorded onto the recording medium by the recording and/or reproducing device. In reproducing the digital audio data, the digital audio data is reproduced from the recording medium by the recording and/or reproducing device, is provided and the digital audio data reproduced is supplied to the first interface circuit and output from the output connector. In recording the general digital data, the general digital data input from the input connector is supplied to the second interface circuit, and the general digital data output from the second interface circuit is supplied to the recording and/or reproducing device and recorded onto the recording medium by the recording and/or reproducing device. In reproducing the general digital data, the general digital data is reproduced from the recording medium by the recording and/or reproducing device, and the general digital data reproduced is supplied to the second interface circuit and output from the output connector.

According to the present invention, there is provided a digital recording and/or reproducing apparatus using a recording medium, including a first interface circuit for inputting and outputting digital audio data, and a second interface circuit for inputting and outputting general digital data excluding the digital audio data. An input connector is provided for inputting the digital audio data and the general digital data and an output connector is provided for outputting the digital audio data and the general digital data. A recording and/or reproducing device for recording and/or reproducing the digital audio data and the general digital data. In recording the digital audio data, the digital audio data input from the input connector is supplied to the first interface circuit, and the digital audio data output from the first interface circuit is supplied to the recording and/or reproducing device and recorded onto the recording medium by the recording and/or reproducing device. In reproducing the digital audio data, the digital audio data is reproduced from the recording medium by the recording and/or reproducing device, and the digital audio data reproduced is supplied to the first interface circuit and output from the output connector. In recording the general digital data, the general digital data input from the input connector is supplied to the second interface circuit, and the general digital data output from the second interface circuit is supplied to the recording and/or reproducing device and recorded onto the recording medium by the recording and/or reproducing device. In reproducing the general digital data, the general digital data is reproduced from the recording medium by the recording and/or reproducing device, and the general digital data reproduced is supplied to the second interface circuit and output from the output connector. In outputting one of the digital audio data and the general digital data from the output connector to equipment connected to the apparatus, the apparatus transmits a query signal to the equipment, and outputs one of the digital audio data and the general digital data from the output connector only when receiving a permission signal responsive to the query signal from the equipment.

The recording and/or reproducing apparatus according to the present invention can be used not only as digital audio equipment but also as an external storage for digital equipment for recording general digital data. That is, the connectors for inputting and outputting digital audio data serve also as the connectors for inputting and outputting general digital data. Therefore, the connectors for inputting and outputting general digital data are not also required. Furthermore, according to the present invention, in outputting general digital data from the output connector to digital audio equipment connected to the apparatus, the output of the general digital data is not permitted. Therefore, the digital audio equipment as the connected equipment is not adversely affected. In addition, the user's hearing is also not adversely affected.

BRIEF DESCRIPTION OF THE DRAWINGS

The invention will be more readily understood with reference to the accompanying drawings, wherein:

FIGS. 1A through 1C are schematic diagrams showing a format of digital audio data D958 standardized by IEC 958, wherein FIG. 1A shows a data structure of the digital audio data D958 in one block; FIG. 1B shows a data structure of the digital audio data D958 in one frame; and FIG. 1C shows a data structure of the digital audio data D958 in one subframe;

FIGS. 3A through 3D are schematic diagrams showing some examples of a method of connecting the apparatus to other equipment, wherein FIG. 3A shows a connection of the apparatus to a digital audio tape recorder; FIG. 3B shows a connection of the apparatus to a CD player and an audio amplifier; FIG. 3C shows a connection of the apparatus to a personal computer; and FIG. 3D shows a connection of the apparatus to general data equipment.

DESCRIPTION OF THE INVENTION

A digital recording and/or reproducing apparatus using a recording medium according to the present invention will be described in detail with reference to the drawings. Prior to the description of a preferred embodiment, there will be described a digital audio interface standardized by IEC 958 to be used in the present invention.

Figure 1A:
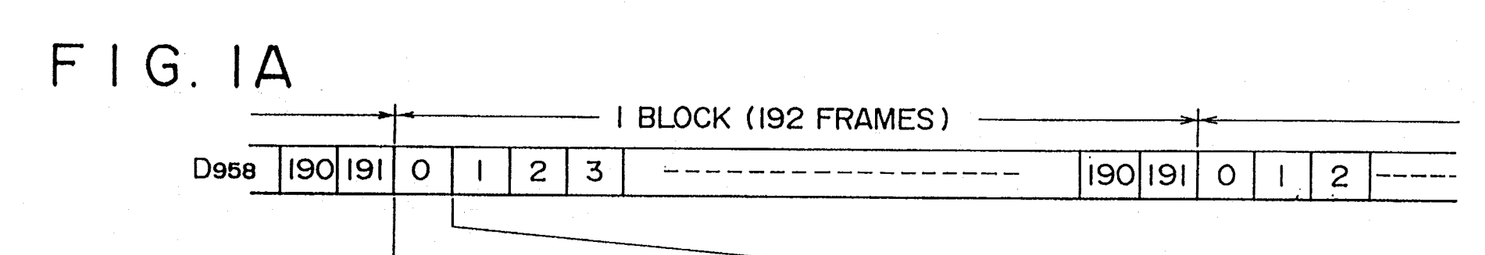
Figures 1B, 1C:
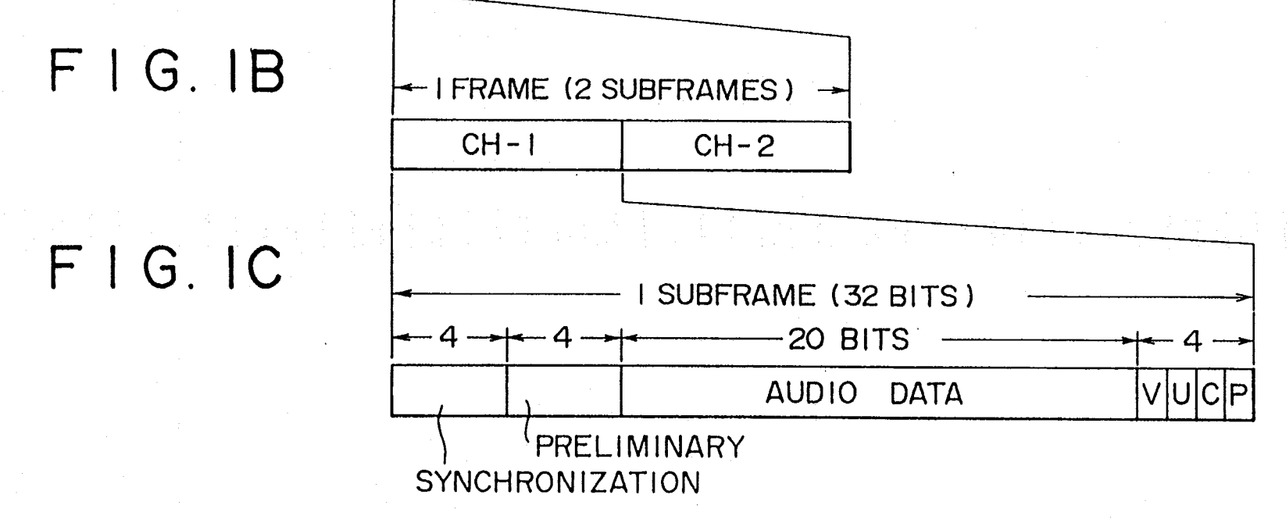

FIGS. 1A to 1C show a signal format of digital audio data to be accessed by the digital audio interface standardized by IEC 958. In FIG. 1A, D958 denotes the digital audio data. While the digital audio data D958 is a serial binary signal as shown in FIG. 1A, it is converted into a biphase mark signal upon transmission. The data D958 is constituted of a plurality of blocks in series. Each block has 192 frames.

As shown in FIG. 1B, each frame has two subframes, which correspond to two channels of digital audio data. In the case of two-channel stereo, the first subframe has a left channel of digital audio data, and the second subframe has a right channel of digital audio data.

As shown in FIG. 1C, each subframe has a magnitude of 32 bits. Of all the bits, the leading four bits constitute a preamble serving as a subframe identification signal and a synchronization signal. The subsequent four bits next to the preamble constitute preliminary bits. The subsequent 20 bits next to the preliminary bits constitute one sample of digital audio data. Of the 20 bits constituting the digital audio data, some required bits only are used. If the required bits are greater than 20 bits, the preliminary bits are used for the digital audio data.

The subsequent four bits next to the digital audio data constitute control data V, U, C, and P. In this case, the data V is called a validity flag. When the subframe to which the data V belongs is valid (i.e., the subframe has no error), the data V becomes "0", whereas when the subframe is invalid (i.e., the subframe has an error), the data V becomes "1". While the data U is undefined, information can be transmitted per block as a unit by assembling the data U of 192 bits corresponding to one block.

The data C is called a channel status, which is used per block as a unit. The data C of 192 bits corresponding to one block indicate a sampling frequency of digital audio data, the presence or absence of preemphasis, the inhibition or permission of digital copy, etc. The data P is used for parity check of the subframe to which the data P belongs.

Thus constructed is the signal format of digital audio data to be accessed by a digital audio interface standardized by IEC 958. As described above, in actually transmitting the data D958, it is converted into a biphase mark signal.

Figure 2:
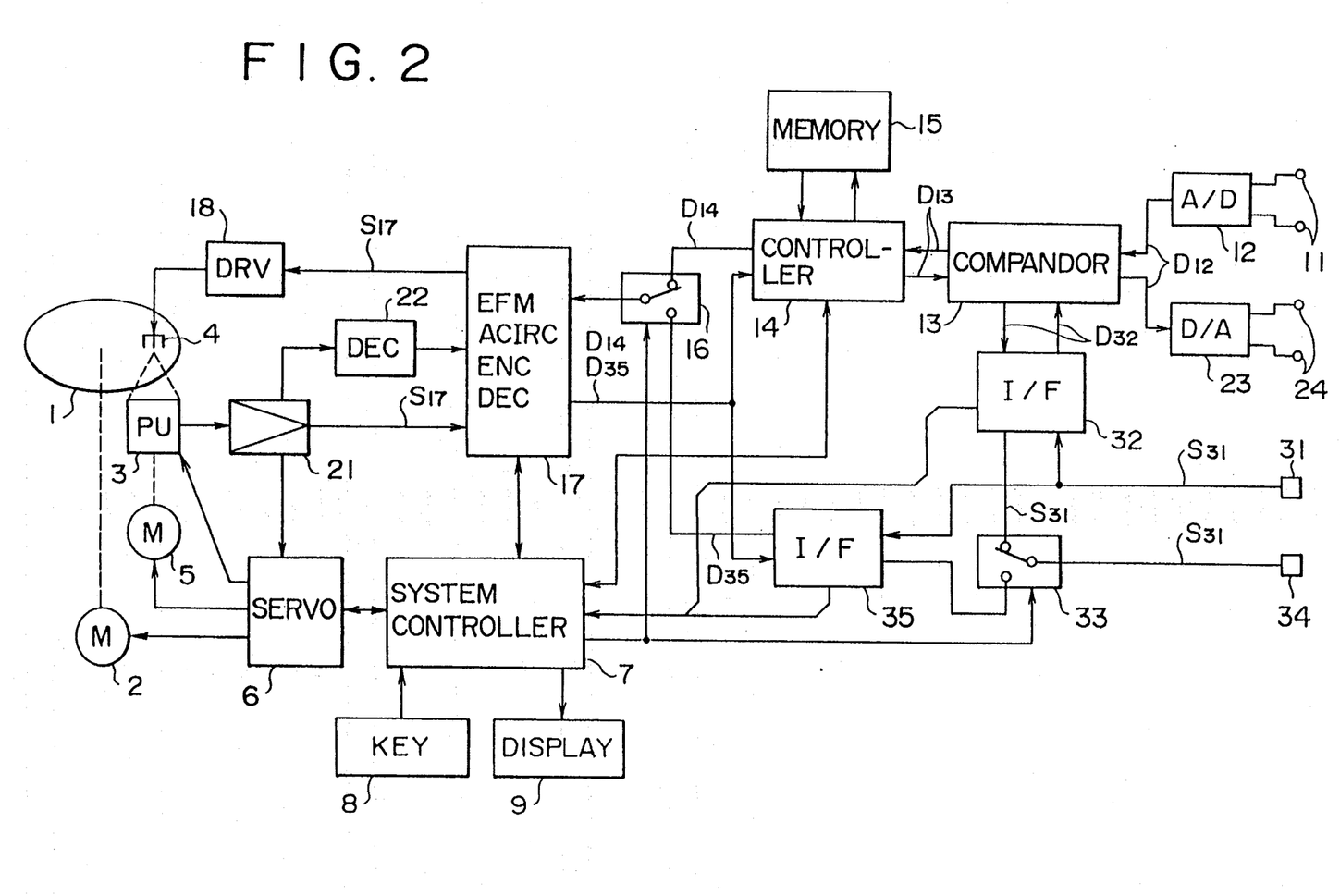
FIG. 2 is a block diagram of a recording and/or reproducing apparatus according to the present invention.

There will now be described a preferred embodiment of the digital recording and/or reproducing apparatus according to the present invention with reference to the drawings. In this preferred embodiment, a magneto-optical disc is used as the recording medium, and an audio signal is recorded to or reproduced from the magneto-optical disc. FIG. 2 is a block diagram of the digital recording and/or reproducing apparatus in this preferred embodiment.

Referring to FIG. 2, reference numeral 1 denotes a magneto-optical disc. The magneto-optical disc 1 is accommodated in a disc cartridge, not shown.

The magneto-optical disc 1 includes a disk-shaped substrate, a recording layer, and a protective film. The disk-shaped substrate is formed of a light transmitting material. For example, a light transmitting synthetic resin such as polycarbonate and PMMA may be used. A pregroove wobbling in the radial direction of the magneto-optical disc 1 is preliminarily spirally formed on the surface of the disk-shaped substrate according to address data. The recording layer is at least one layer formed of a magneto-optical recording material such as TbFeCo by vapor deposition, sputtering, etc. on the surface of the disk-shaped substrate where the pregroove is formed. The protective film is formed on the recording layer by using an ultraviolet curing resin, so as to protect the recording layer. The magneto-optical disc 1 has a data recording area and a TOC (Table Of Contents) area where TOC information is recorded. In the data recording area, data is discretely or continuously recorded along the pregroove. The recording of data to the data recording area or the reproducing of data recorded in the data recording area is intermittently performed per cluster as a unit. Each cluster has 32 sectors where data is actually recorded and four linking sectors. The leading three sectors of the four linking sectors serve to prevent the interference of interleave of CIRC provided in data between the clusters adjacent to each other. The remaining sector subsequent to these three sectors is used for subdata. Each sector has a plurality of sound groups. Eleven sound groups constitute a pair of sectors. In this preferred embodiment, each sector has 2352 bytes, in which 2332 bytes are used for data. Each sound group has 424 bytes, and it corresponds to 512 samples of R-channel and L-channel audio signals, which correspond to a reproduction time of 11.61 (msec). In the TOC area, there are recorded title information relating to data or program recorded in the data recording area, address information such as start address and end address of each data or the program, and information indicative of a connected relation between small recording areas. After the magneto-optical disc 1 is loaded into the recording and/or reproducing apparatus, and before data is recorded into the data recording area or data is reproduced, the information recorded in the TOC area is read out by an optical pickup to be hereinafter described, and is stored into a memory area in a system controller to be hereinafter described or into a dedicated memory area in a buffer memory to be hereinafter described. Each start address and the end address recorded in the TOC area has 24 bits, wherein the high-order 14 bits indicate cluster numbers; the subsequent 6 bits indicate sector numbers; and the low-order 4 bits indicate sound group numbers. The pregroove cluster formed on the magneto-optical disc 1 is wobbled in the radial direction of the disc 1 according to a signal modulated on the basis of the address data including each address of sector. The signal reproduced from the pregroove is demodulated, and a recording position or a reproducing position is confirmed and managed by the system controller in a recording or reproducing operation.

Reference numeral 2 denotes a spindle motor for rotationally driving the magneto-optical disc 1 at a constant linear velocity. A turntable (not shown) is mounted on a rotating shaft of the spindle motor 2 at one end thereof. The magneto-optical disc 1 in the disc cartridge loaded in the recording and/or reproducing apparatus is placed on the turntable.

Reference numeral 3 denotes an optical pickup having an objective lens. The optical pickup 3 includes a laser light source, an optical system including a beam splitter for separating a light beam emitted from the laser light source and a return light beam from the magneto-optical disc 1, and a photodetector for detecting the return light beam separated by the beam splitter. The objective lens serves to focus the light beam emitted from the laser light source through one of openings of the disc cartridge and through the disk-shaped substrate onto the recording layer of the magneto-optical disc 1. The optical pickup 3 includes an actuator for driving the objective lens in a focusing direction and a tracking direction. The actuator is supplied with a focusing servo signal and a tracking servo signal from a servo control circuit to be hereinafter described. Accordingly, the objective lens is driven in the focusing direction and the tracking direction so that a focusing error signal and a tracking error signal become zero, thus performing focusing servo and tracking servo.

Reference numeral 4 denotes a magnetic head. The magnetic head 4 faces the protective film of the magneto-optical disc 1 through the other opening of the disc cartridge. The magnetic head 4 is located at a position opposite to the optical pickup 3 with the magneto-optical disc 1 interposed therebetween. The magnetic head 4 generates a vertical magnetic field according to recording data on the basis of a driving signal supplied from a head driving circuit to be hereinafter described. The vertical magnetic field thus generated is applied to the recording layer from the protective film side of the magneto-optical disc 1. The magnetic head 4 is mechanically connected to the optical pickup 3 in such a manner that the magnetic head 4 is moved in the radial direction of the magneto-optical disc 1 by moving the optical pickup 3 in the radial direction of the magneto-optical disc 1.

Reference numeral 5 designates a feed motor. The feed motor 5 feeds the optical pickup 3 in the radial direction of the magneto-optical disc 1 by supplying a driving force to a feed mechanism (not shown) according to a feed signal supplied from the servo control circuit.

Reference numeral 6 denotes a servo control circuit. The servo control circuit 6 is supplied with a focusing error signal, a tracking error signal, and an RF signal or a synchronization signal extracted from address data, these signals being supplied from an RF amplifier to be hereinafter described. According to these signals, the servo control circuit 6 generates a focusing servo signal, a tracking servo signal, and a spindle servo signal. The focusing servo signal and the tracking servo signal are supplied to the actuator in the optical pickup 3, thereby performing focusing servo and tracking servo as mentioned above. The spindle servo signal is generated according to either the RF signal or the synchronization signal extracted from the address data. The spindle servo signal is supplied to the spindle motor 2 to drive it so that the magneto-optical disc 1 may be rotated at a constant linear velocity (CLV). The servo control circuit 6 also generates a feed signal. The feed signal is generated according to a low-range frequency component of the tracking error signal. The feed signal is supplied to the feed motor 5, and the feed motor 5 then supplies a driving force to the feed mechanism according to the feed signal, thereby feeding the optical pickup 3 and the magnetic head 4 in the radial direction of the magneto-optical disc 1 in synchronism with scanning of the light beam from the optical pickup 3 over the recording tracks of the magneto-optical disc 1. The servo control circuit 6 also generates an access signal according to an access command generated from the system controller, and supplies the access signal to the feed motor 5. The access signal is supplied to the feed motor 5, and the optical pickup 3 and the magnetic head 4 are moved in the radial direction of the magneto-optical disc 1 by the feed mechanism by a distance according to the access command.

Reference numeral 7 denotes a system controller constructed of a microcomputer. An input device 8 and a display device 9 are connected to the system controller 7. The system controller 7 generates various control signals for starting and stopping a recording or reproducing operation and for performing an access operation according to input signals from the input device 8.

Further, the system controller 7 controls various elements of the recording and/or reproducing apparatus including the servo control circuit 6, an encoder/decoder, and a memory controller to be hereinafter described, and also controls the operation of the recording and/or reproducing apparatus. An output level of the light beam to be emitted from the optical pickup 3 is controlled by a control signal supplied from the system controller 7. In the recording operation, the output level of the light beam to be emitted from the optical pickup 3 is an output level enough to record data. In the case where the occurrence of track jump is recognized by the system controller 7, the output level is immediately lowered to an output level such that data cannot be recorded, e.g., to an output level in the reproducing operation.

The input device 8 is provided on a front panel of a body of the recording and/or reproducing apparatus. The input device 8 includes a plurality of operation keys such as a power key for turning on and off a power supply, a reproducing key for starting a reproducing operation, a recording key for starting a recording operation, a stop key for stopping the recording operation and the reproducing operation, and a key for performing an access operation or the like.

The display device 9 is also provided on the front panel of the body of the recording and/or reproducing apparatus. The display device 9 is constructed of a display element such as a liquid crystal display (LCD) and a fluorescent display tube. The display device 9 is supplied with a display control signal generated from the system controller 7 according to the data recorded in the TOC area of the magneto-optical disc 1. According to the display control signal, the display device 9 displays time information such as a total reproducing time of the magneto-optical disc 1, an elapsed reproducing time of data or program during reproduction, a residual reproducing time of data or program during reproduction, and a residual recordable time. Further, the display device 9 displays a track number or the like during reproduction or recording. In the case where title information relating to the title of the disc itself, each data or program and data information relating to the recording date of each data or program are recorded on the magneto-optical disc 1, these pieces of information are selectively displayed on the display device 9.

Reference numeral 12 denotes an A/D (Analog to Digital) converter. The A/D converter 12 converts an input signal, e.g., analog audio signal, supplied from an input terminal 11 into a digital signal at a sampling frequency of 44.1 (KHz) and a quantization bit number of 16 bits. In FIG. 2, the analog audio signal supplied from the input terminal 11 is shown as one channel for simplicity. Actually, however, it is a 2-channel stereo signal of L- and R-channels. The same will apply hereinafter.

Reference numeral 13 denotes a compander. The compander 13 is supplied with a digital signal such as digital audio signal output from the A/D converter 12. The compander 13 compresses the digital audio signal to about 1/5. The compander 13 uses a modified DCT (Discrete Cosine Transform) as a data compression technique.

Digital data output from the compander 13 is once stored through a memory controller 14 into a buffer memory 15. A DRAM (Dynamic Random Access Memory) having a storage capacity of 4 Mbits is used as the buffer memory 15. The memory controller 14 controls writing of data into the memory 15 and reading of data from the memory 15 as hereinafter described. In recording to the magneto-optical disc 1, digital data output from the compander 13 is written into the memory 15 by the memory controller 14 at a transfer rate of 0.3 (Mbit/sec), and data stored in the memory 15 is read out from the memory 15 by the memory controller 14 at a transfer rate of 1.41 (Mbits/sec). In reproducing from the magneto-optical disc 1, digital data output from an encoder/decoder to be hereinafter described is written into the memory 15 by the memory controller 14 at a transfer rate of 1.41 (Mbits/sec), and data stored in the memory 15 is read out from the memory 15 by the memory controller 14 at a transfer rate of 0.3 (Mbit/sec).

If there occurs no track jump due to disturbance such as vibration such that a recording position on the magneto-optical disc 1 jumps to another position or another track during recording, the compressed digital data stored in the memory 15 is sequentially read out from the memory 15 at a transfer rate about five times that in writing data into the memory 15. The digital data read out from the memory 15 is supplied to the encoder/decoder. If the track jump occurs during recording to the magneto-optical disc 1, a detection signal of the track jump is supplied to the system controller 7. In this case, the memory controller 14 stops the transfer of the digital data to the encoder/decoder, and controls the memory 15 to store the compressed digital data output from the compander 13 into the memory 15. Thereafter, an irradiation position of the light beam directed onto the magneto-optical disc 1, that is, a recording position is corrected. Then, the memory controller 14 controls writing of data into the memory 15 and reading of data from the memory 15 so as to restart the transfer of the digital data to the encoder/decoder. The correction of the recording position is performed according to the address data in the magneto-optical disc 1.

The detection of the track jump may be performed by providing a vibration meter in the recording and/or reproducing apparatus and determining whether or not vibration detected by the vibration meter causes the track jump by the use of the system controller 7. In another way, address data is recorded in the pregroove as mentioned above. Therefore, the detection of the track jump may be performed by reading the address data during recording and monitoring the continuity of decoded address data output from an address decoder to be hereinafter described by the use of the system controller 7. In still another way, the detection of the track jump may be performed by obtaining OR (logical sum) between a detection signal from the vibration meter and a detection signal of the continuity of the decoded address data. When the track jump is detected, the optical pickup 3 is controlled by the system controller 7 in such a manner that the output level of the light beam directed from the optical pickup 3 onto the magneto-optical disc 1 is lowered to an unrecordable level or zero.

In this case, the memory 15 is required to have a minimum storage capacity capable of storing digital data corresponding to a period of time from the occurrence of the track jump to the correction of the recording position. In this preferred embodiment, this requirement is met because DRAM having a storage capacity of 4 Mbits is used as the memory 15.

During normal recording, the memory controller 14 controls writing and reading of data to/from the memory 15 so that the quantity of data stored in the memory 15 becomes as small as possible. That is, when the quantity of data stored in the memory 15 becomes a predetermined quantity or more, the predetermined quantity of data, e.g., data of one cluster is read out from the memory 15, thus always ensuring a storage area capable of storing the predetermined quantity or more of data in the memory 15.

Thus, the digital data readout from the memory 15 is supplied through a switch circuit 16 into an EFM (Eight-to-Fourteen Modulation) and CIRC (Cross Interleave Reed-Solomon Code) coder/decoder 17. The switch circuit 16 is operated by the system controller 7, for example, according to the kind of digital data to be recorded to or read out from the magneto-optical disc 1.

The encoder/decoder 17 performs error correction coding of the digital data supplied and also performs modulation fit for recording. In this preferred embodiment, EFM is performed as the modulation fit for recording, and a code changed in interleave from CIRC for a Compact Disc (CD) is used as an error correction code.

The recording data output from the encoder/decoder 17 is supplied to a head driving circuit 18. The head driving circuit 18 generates a driving signal for the magnetic head 4 according to the recording data supplied, and supplies the driving signal to the magnetic head 4.

Reference numeral 21 denotes an RF amplifier. The RF amplifier 21 is supplied with an output signal from the photodetector in the optical pickup 3. The RF amplifier 21 generates an RF signal as a reading signal for the magneto-optical disc 1 according to the output signal from the photodetector in the optical pickup 3. Since the magneto-optical disc 1 is used as the recording medium in this preferred embodiment, the RF signal is output from the RF amplifier 21 according to a difference in Kerr rotation angle of the light beam reflected on the recording layer of the magneto-optical disc 1. The RF signal is supplied to the encoder/decoder 17. Further, the RF amplifier 21 generates a focusing error signal according to the output signal from the photodetector by using a so-called astigmatism method. The RF amplifier 21 also generates a tracking error signal according to the output signal from the photodetector by using a so-called 3-spot method. The RF amplifier 21 also generates a detection signal for the wobbling pregroove, i.e., a push-pull signal according to the output signal from the photodetector by using a so-called push-pull method, and supplies the push-pull signal to an address decoder to be hereinafter described. The astigmatism method is described in U.S. Pat. No. 4,023,033, for example. The 3-spot method is described in U.S. Pat. No. 3,876,842, for example. The push-pull method is described in U.S. Pat. No. 3, 909,608, for example. The focusing error signal and the tracking error signal generated by the RF amplifier 21 are supplied to the servo control circuit 6. The RF signal generated by the RF amplifier 21 is also supplied to the servo control circuit 6, so as to generate a spindle servo signal.

Reference numeral 22 denotes an address decoder. The address decoder 22 is supplied with the push-pull signal generated by the RF amplifier 21. The address decoder 22 generates address data by FM demodulation of the push-pull signal supplied. The address data output from the address decoder 22 is supplied to the encoder/decoder 17 to perform decoding. The decoded address data is supplied to the system controller 7. In the system controller 7, the decoded address data is used for confirmation of a recording position or a reproducing position and for control of the position in recording or reproducing. A synchronization signal is extracted from the address data decoded by the address decoder 22, and is supplied to the servo control circuit 6, so as to generate a spindle servo signal.

Reference numeral 23 denotes a D/A (Digital to Analog) converter. The D/A converter 23 performs processing reverse to that of the A/D converter 12 to a digital audio signal output from the compander 13, and supplies an analog audio signal to an output terminal 24.

Reference numeral 31 denotes an optical connector for inputting digital data. The optical connector 31 is constructed of a photosensor.

Reference numeral 32 denotes a first interface circuit. The first interface circuit 32 is supplied with a biphase mark signal S31 output from the optical connector 31. The first interface circuit 32 converts the biphase mark signal S31 into digital data D958, and converts a serial signal as the data D958 into a parallel signal.

Reference numeral 33 denotes a switch circuit. As similar to the switch circuit 16 mentioned above, the switch circuit 33 is operated by the system controller 7, for example, according to the kind of digital data to be recorded to or read out from the magneto-optical disc 1.

Reference numeral 34 denotes an optical connector for outputting digital data. The optical connector 34 is constructed of an LED or the like. The optical connector 34 is supplied with a biphase mark signal S31 which has been converted from digital data D32 output from the compander 13 by the first interface circuit 32. The optical connector 34 outputs an optical signal modulated in intensity by the biphase mark signal S31.

Reference numeral 35 denotes a second interface circuit. The second interface circuit 35 is supplied with data D35 output from the encoder/decoder 17. The second interface circuit 35 converts a parallel signal as the data D35 to a serial signal to generate data DGTL, and converts the data DGTL into a biphase mark signal S31. The biphase mark signal S31 is output to the optical connector 34.

Recording of Analog Audio Signal

When the recording key of the input device 8 is operated, the system controller 7 generates a control signal to start the operation of each element of the recording and/or reproducing apparatus. After focusing servo, tracking servo, etc. are started, an input signal such as analog audio signal input from the input terminal 11 is supplied to the A/D converter 12, and is converted into a 16-bit digital audio signal by the A/D converter 12. The digital audio signal is supplied to the compander 13, and is compressed to about 1/5 in data quantity by the compander 13. Then, the digital data D13 thus compressed is once stored through the memory controller 14 into the memory 15. The digital data D14 once stored in the memory 15 is read out by the memory controller 14, and is supplied through the switch circuit 16 to the encoder/decoder 17. The digital data D14 supplied to the encoder/decoder 17 is subjected to EFM and error correction coding, and is converted into recording data S17. The recording data S17 is supplied through the head driving circuit 18 to the magnetic head 4. The magnetic head 4 applies to the magneto-optical disc 1 a vertical magnetic field modulated by a driving signal according to the recording data S17. At this time, a light beam having an output level required for recording is directed from the optical pickup 3 onto the recording layer of the magneto-optical disc 1 through the disk-shaped substrate. As a result, the recording layer of the magneto-optical disc 1 is heated to a temperature equal to or greater than the Curie temperature by the light beam directed from the optical pickup 3. Thereafter, the temperature of the recording layer is lowered to a temperature less than the Curie temperature by relative movement of the light beam and the magneto-optical disc 1. At this time, a direction of magnetization of the recording layer is changed and decoded according to a direction of the vertical magnetic field applied to the magneto-optical disc 1 by the magnetic head 4, thereby recording the data onto the magneto-optical disc 1. In this manner, the data corresponding to the original analog audio signal by about two seconds (one cluster) is recorded onto the magneto-optical disc 1 in a period of about 0.4 (sec). The recording of data onto the magneto-optical disc 1 is intermittently performed per cluster as a unit.

If the occurrence of track jump due to vibration or the like is detected by the system controller 7 during the above recording operation, the output level of the light beam emitted from the optical pickup 3 is immediately lowered to an unrecordable level, and simultaneously the supply of the recording data to the magnetic head 4 is stopped or the reading of the digital data from the memory 15 is stopped. The input signal input from the input terminal 11 is once stored until the light beam emitted from the optical pickup 3 accesses again to the previous position prior to the occurrence of track jump. When the access of the light beam is completed, the output level of the light beam emitted from the optical pickup 3 is raised to the output level required for recording, and the supply of the recording data to the magnetic head 4 is restarted, thus restarting the recording operation.

A recording start position in the data recording area of the magneto-optical disc 1 is set and controlled by the system controller 7 according to data input from the input device 8 or data read out from the TOC area stored in the memory area of the system controller 7 or in the dedicated memory area of the memory 15. During the recording operation, the data read out from the TOC area and held in the system controller 7 or in the memory 15 is occasionally changed in accordance with the recording operation. When the recording operation of data corresponding to all input signals is terminated, or when the stop key of the input device 8 is operated, the optical pickup 3 and the magnetic head 4 are accessed to the TOC area of the magneto-optical disc 1 to update the data recorded in the TOC area. After the updating operation is terminated, the disc cartridge is ejected from the recording and/or reproducing apparatus.

Reproduction of Analog Audio Signal

When the disc cartridge is loaded into the recording and/or reproducing apparatus, the spindle motor 2 is started, and focusing servo and tracking servo are drawn. Then, the optical pickup 3 is fed radially inwardly of the magneto-optical disc 1 to read out the TOC area of the magneto-optical disc 1. At this time, the output level of the light beam directed from the optical pickup 3 to the magneto-optical disc 1 is set to an unrecordable level, that is, an output level such that the light beam cannot heat the recording layer to the Curie temperature. The data recorded in the TOC area read by the optical pickup 3 is stored into the memory area of the system controller 7 or into the dedicated memory area of the memory 15. Then, the optical pickup 3 is fed to the data recording area of the magneto-optical disc 1 to read out the data recorded in the data recording area. A reading position and a reading sequence of the data in the data recording area are controlled by the system controller 7 according to an input signal input from the input device 8. An output signal from the photodetector in the optical pickup 3 is supplied to the RF amplifier 21, and the RF amplifier 21 generates various signals including a focusing error signal, a tracking error signal, and an RF signal S17 as mentioned above. The focusing error signal, the tracking error signal, and either the RF signal S17 or a synchronization signal extracted from address data are supplied to the servo control circuit 6, and the servo control circuit 6 generates a focusing servo signal, a tracking servo signal, a spindle servo signal, and a feed signal.

The focusing servo signal and the tracking servo signal are supplied to the actuator of the optical pickup 3 to thereby effect focusing servo and tracking servo. The spindle servo signal is supplied to the spindle motor 2 to thereby effect spindle servo. The RF signal S17 is supplied to the EFM and CIRC encoder/decoder 17 to effect EFM demodulation and error correction. The address data decoded by the address decoder 22 is supplied through the encoder/decoder 17 to the system controller 7. According to the address information supplied, the system controller 7 performs reproducing position control of the optical pickup 3 in the radial direction of the magneto-optical disc 1. The system controller 7 manages a reproducing position on a recording track of the magneto-optical disc 1 scanned by the optical pickup 3 by using the address information reproduced. The reading out of data from the magneto-optical disc 1 is intermittently performed per cluster as a unit. Digital data D14 output from the encoder/decoder 17 is once stored through the memory controller 14 into the memory 15. If there occurs no track jump due to vibration to cause movement of a reproducing position during the reproducing operation, the memory controller 14 writes the digital data D14 into the memory 15 at a transfer rate of 1.41 (Mbits/sec), and reads out the digital data D14 stored in the memory 15 from the memory 15 at a transfer rate of 0.3 (Mbit/sec). The memory controller 14 controls writing of the digital data into the memory 15 so that the quantity of data stored in the memory 15 does not become a predetermined quantity or less. If the data quantity in the memory 15 is a predetermined quantity or more, the reading out of data from the magneto-optical disc 1 is once stopped to maintain a so-called pause condition. If the occurrence of track jump is detected by the system controller 7 during the reproducing operation, the memory controller 14 stops the writing of the digital data D14 output from the encoder/decoder 17, and controls the memory 15 to perform only transfer of digital data D13 from the memory 15 to the compander 13. Thereafter, the irradiation position of the light beam directed from the optical pickup 3 to the magneto-optical disc 1, that is, the reproducing position is returned to the previous position before the occurrence of track jump. Then, the writing of the digital data D14 output from the encoder/decoder 17 into the memory 15 is restarted. During the period until the correcting operation for the reproducing position, the digital data D14 stored in the memory 15 is read out and decoded to be output from the output terminal 24.

The digital data D13 read out from the memory 15 is supplied to the compander 13, and is expanded by the compander 13. Digital audio data output from the compander 13 is supplied to the D/A converter 23, and is converted into an analog audio signal by the D/A converter 23. The analog audio signal is output from the output terminal 24 to an external circuit such as an amplifier circuit.

In the normal reproducing operation, the memory controller 14 controls the writing of data into the memory 15 so that the memory 15 may store the data in such a quantity or more as to correspond to a minimum time required for the correcting operation for the reproducing position. If the data quantity in the memory 15 becomes a predetermined quantity or less, the memory controller 14 instructs the system controller 7 to generate a control signal, which controls the optical pickup 3 to intermittently read out the data from the magneto-optical disc 1. Then, the digital data from the encoder/decoder 17 is written into the memory 15. In the case of using a DRAM having a storage capacity of 1 Mbit as the memory 15, the time required for fully writing digital data into the memory 15 is about 0.9 (sec), and this digital data corresponds to an analog signal for about 3 (sec). In other words, even when digital data is fully stored in the memory 15 and no output signal is supplied from the optical pickup 3 having read out the magneto-optical disc 1 because of vibration or the like, an analog signal can continue to be output from the output terminal 24 as a reproducing signal for about 3 (sec). In this preferred embodiment, a DRAM having a storage capacity of 4 Mbits is used as the memory 15, so that an analog reproducing signal can continue to be output from the output terminal 24 for 12 (sec). During this period of time, the reproducing position on the disc 1 by the optical pickup 3 is accessed again to the previous position before the occurrence of track jump, and the reading out of data from the disc 1 is restarted, thereby preventing break of output of the analog signal as the reproducing signal from the output terminal 24.

When the reproducing operation of all the data recorded on the magneto-optical disc 1 is terminated, or when the stop key of the input device 8 is operated, the reproducing operation is stopped. Then, the disc cartridge is ejected from the recording and/or reproducing apparatus.

Recording of Digital Audio Data

In the recording and/or reproducing apparatus according to the present invention, a biphase mark signal S31 modulated by digital audio data D958 is accessed in the state of an optical signal.

The optical signal modulated in intensity by the biphase mark signal S31 modulated by the digital audio signal D958 is supplied to the optical connector 31 constructed of a photosensor to take the biphase mark signal S31. Then, the biphase mark signal S31 is supplied to the first interface circuit 32 to demodulate the digital audio data D958 from the signal S31 and convert a serial signal as the data D958 into a parallel signal. Digital audio data D32 similar to the digital audio data D12 is output from the first interface circuit 32, and is supplied to the compander 13. Digital data output from the compander 13 is subjected to processing similar to the signal processing in the recording of the analog audio signal mentioned above. Thus, the data D958 is recorded onto the magneto-optical disc 1.

Reproduction of Digital Audio Data

As similar to the reproduction of the analog audio signal mentioned above, data is read out from the magneto-optical disc 1, and is supplied through the encoder/decoder 17, the memory 15, etc. to the compander 13. Data D32 is output from the compander 13, and is supplied to the first interface circuit 32, in which the data D32 is converted from a parallel signal into a serial signal as data D958, and the data D958 is converted into a biphase mark signal S31. Then, the biphase mark signal S31 is supplied through the switch circuit 33 to the optical connector 34 constructed of an LED. Thus, an optical signal modulated in intensity by the biphase mark signal S32 modulated by the digital audio data D958 is output from the optical connector 34.

Recording of General Digital Data

In the recording and/or reproducing apparatus according to the present invention, a biphase mark signal S31 modulated by general digital data DGTL is accessed in the state of an optical signal.

The optical signal modulated in intensity by the biphase mark signal S31 modulated by the serial digital data DGTL is supplied to the optical connector 31 to take the biphase mark signal S31. The biphase mark signal S31 is supplied to the second interface circuit 35 to demodulate the serial digital data DGTL from the signal S31 and convert a serial signal as the data DGTL into a parallel signal. Digital data D35 similar to the compressed data D14 is output from the second interface circuit 35, and is supplied through the switch circuit 16 to the encoder/decoder 17. Digital data output from the encoder/decoder 17 is subjected to processing similar to the signal processing in the recording of the analog audio signal mentioned above. Thus, the data DGTL is recorded onto the magneto-optical disc 1.

Reproduction of General Digital Data

As similar to the reproduction of the analog audio signal mentioned above, data recorded on the magneto-optical disc 1 is read out by the optical pickup 3, and an output signal from the optical pickup 3 is supplied to the encoder/decoder 17. Data D35 similar to the data D14 is output from the encoder/decoder 17. Then, the data D35 is supplied to the second interface circuit 35, in which a parallel signal as the data D35 is converted into a serial signal as data DGTL, and the data DGTL is converted into a biphase mark signal S31. The biphase mark signal S31 is supplied through the switch circuit 33 to the optical connector 34. Thus, an optical signal modulated in intensity by the biphase mark signal S31 modulated by the digital data DGTL is output from the optical connector 34. In recording or reproducing the general digital data, the data is not stored into the memory 15. Accordingly, in the case where track jump occurs, a compensating operation as in the recording of the analog or digital audio data mentioned above is not carried out.

Identification of Recording or Reproducing Data

As apparent from the above description, the switch circuits 16 and 33 must be switched to the condition shown in FIG. 2 or the condition reverse to that shown in FIG. 2 according to the content of a digital signal to be recorded or reproduced. The switching operation may be realized in the following manner, for example.

A code indicating whether the magneto-optical disc 1 is to be used for audio data or general digital data is preliminarily recorded in the TOC area of the magneto-optical disc 1. When the magneto-optical disc 1 is loaded into the recording and/or reproducing apparatus, the code is read out from the TOC area of the magneto-optical disc 1, and the switch circuits 16 and 33 are switched to the condition according to the read code by the system controller 7.

As a second way, it is checked in the first and second interface circuits 32 and 35 whether the assumption that the currently processed signal is digital audio data does not involve any inconsistencies, and whether the assumption that the currently processed signal is general digital data does not involve any inconsistencies. According to the result of this check, the switch circuits 16 and 33 are switched to the corresponding condition.

In a third way, a certain key of the input device 8 is operated by a user to designate the kind of a digital signal to be recorded in recording data, thereby switching the switch circuits 16 and 33 to the corresponding condition. Further, a code indicating the kind of the digital signal is recorded into a user's TOC area of the magneto-optical disc 1 in every recording. In reproducing the data recorded, the switch circuits 16 and 33 are switched according to the code recorded above.

In a fourth way, an optical signal modulated in intensity by a biphase mark signal S31 is supplied to the optical connector 31 in recording digital audio data D958. In contrast, an optical signal modulated in intensity by any modulation signal other than a biphase mark signal, e.g., by a QPSK signal is supplied to the optical connector 31. Then, in the first and second interface circuits 32 and 35, it is checked from this difference in signal modulation type whether the assumption that the currently processed signal is digital audio signal does not involve any inconsistencies, and whether the assumption that the currently processed signal is general digital data does not involve any inconsistencies. According to the result of check, the switch circuits 16 and 33 are switched to the corresponding condition. Further, a code indicating the kind of the digital signal is recorded into the user's TOC area of the magneto-optical disc 1. In reproducing the data recorded, the switch circuits 16 and 33 are switched according to the code recorded above.

In a fifth way, an identification hole indicating whether the magneto-optical disc 1 is to be used for audio data or general digital data is formed in the disc cartridge accommodating the magneto-optical disc 1. When the disc cartridge is loaded into the recording and/or reproducing apparatus, the identification hole is read by a sensor provided in the apparatus. According to the result of reading of the identification hole, the switch circuits 16 and 33 are switched to the corresponding condition by the system controller 7.

In a sixth way, general digital data is also accessed in accordance with the signal format standardized by IEC 958 as shown in FIG. 1 similarly to digital audio data. In this case, a code indicating general digital data may be added to the data U, or the data V (validity flag) may be set to "1" (invalid) in the case of general digital data. Thus, either the digital audio data or the general digital data is identified, and the switch circuits 16 and 33 are switched to the corresponding condition.

In any case, the result of identification whether the signal being recorded or reproduced is digital audio data or general digital data may be displayed on the display device 9.

Method of Connection with Other Equipment

FIGS. 3A to 3D show some examples of a method of connecting the recording and/or reproducing apparatus according to the present invention to other digital equipment, in which reference numeral 40 denotes the recording and/or reproducing apparatus according to the present invention.

Figure 3A:
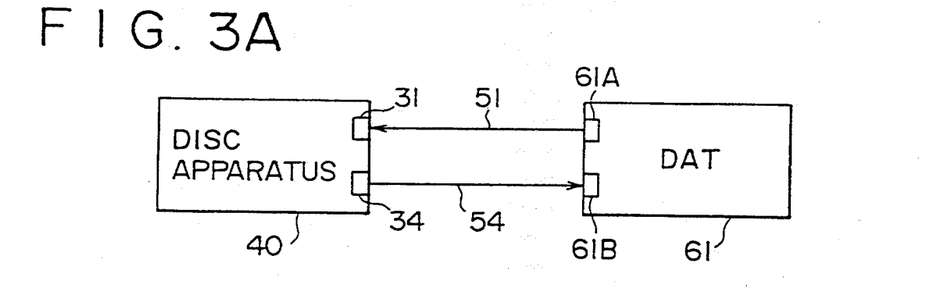

In the example shown in FIG. 3A, the recording and/or reproducing apparatus 40 is connected to another digital audio recording and/or reproducing apparatus such as DAT (Digital Audio Tape) recorder/player 61. The input and output optical connectors 31 and 34 of the recording and/or reproducing apparatus 40 are connected through optical cables 51 and 54 to output and input optical connectors 61A and 61B of the DAT recorder/player 61, respectively.

Figure 3B:
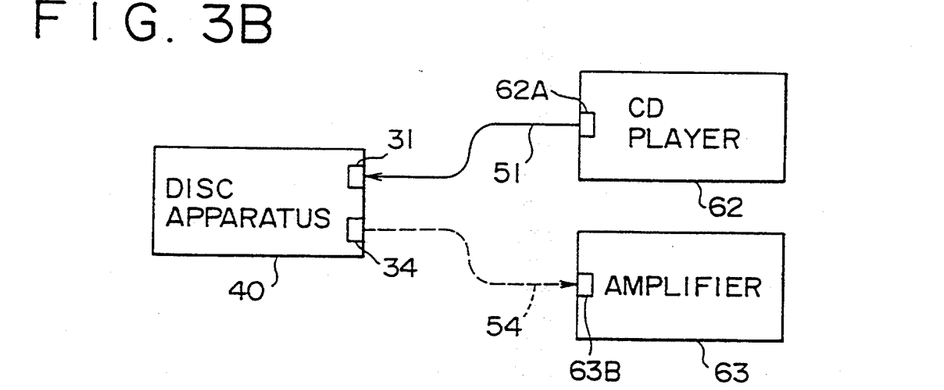

In the example shown in FIG. 3B, the recording and/or reproducing apparatus 40 is connected to a digital audio reproducing apparatus such as a CD (Compact Disc) player 62 or to an audio amplifier 63 having a D/A converter. The input optical connector 31 of the recording and/or reproducing apparatus 40 is connected through an optical cable 51 to an output optical connector 52A of the CD player 62. Alternatively, the output optical connector 34 of the recording and/or reproducing apparatus 40 is connected through an optical cable 54 to an input optical connector 63B of the audio amplifier 63.

Figure 3C:
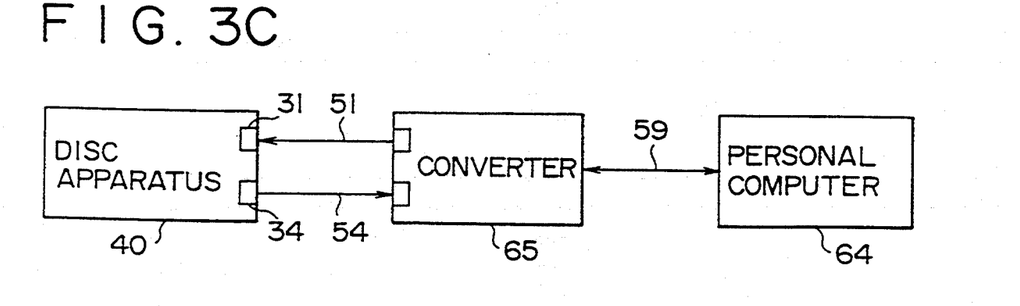

In the example shown in FIG. 3C, the recording and/or reproducing apparatus 40 is used as an external storage for a personal computer 64. Digital data in the personal computer 64 is converted into an RS-232C signal, for example, which is in turn supplied through a cable 59 to a converter 65. In the converter 65, the RS-232C signal is converted into digital data DGTL, which is in turn converted into a biphase mark signal S31. After the biphase mark signal S31 is converted into an optical signal, the optical signal is supplied through an optical cable 51 to the input optical connector 31 of the recording and/or reproducing apparatus 40. Further, an optical signal output from the output optical connector 34 of the recording and/or reproducing apparatus 40 is supplied through an optical cable 54 to the converter 65, in which the optical signal is converted into an RS-232C signal. The RS-232C signal is then supplied through the cable 59 to the personal computer 64.

Figure 3D:
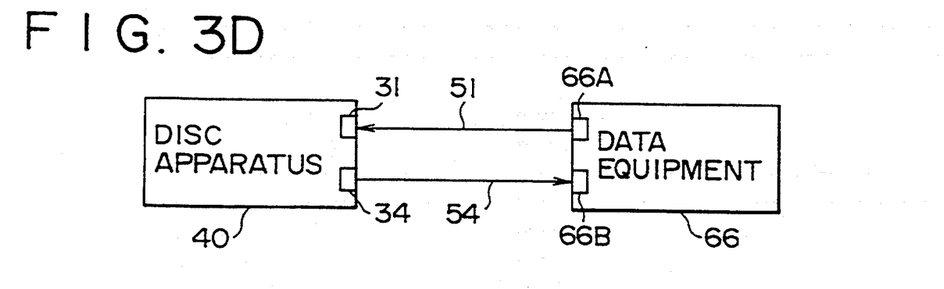

In the example shown in FIG. 3D, the recording and/or reproducing apparatus 40 is used as an external storage for data equipment 66. The data equipment 66 has output and input connectors 66A and 66B for optical signals, and an input/output interface circuit (not shown) for digital data. Accordingly, the recording and/or reproducing apparatus 40 and the data equipment 66 are directly connected together by optical cables 51 and 54.

Output of Signal to Other Equipment

In the case where the recording and/or reproducing apparatus 40 is connected through the optical cable 54 to the audio amplifier 63 as shown by a broken line in FIG. 3B, it is assumed that the magneto-optical disc 1 on which general digital data has been recorded is erroneously loaded into the recording and/or reproducing apparatus 40, and the apparatus 40 is set to a reproducing mode. In this case, the general digital data is supplied to the audio amplifier 63, and in the worst case, there is a possibility that the digital data may be converted into a meaningless analog signal, which is amplified and then supplied to a speaker (not shown), breaking the speaker or adversely affecting user's hearing.

To prevent such a trouble, the recording and/or reproducing apparatus 40 performs a handshaking procedure as shown in FIGS. 4A to 4D when outputting an optical signal.

Figure 4A:
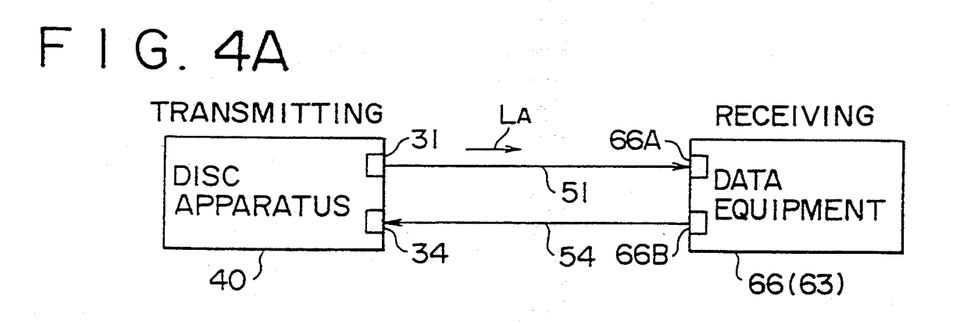
FIGS. 4A through 4D are schematic diagrams illustrating a handshaking procedure to be performed between the apparatus and the general data equipment.

In the case shown in FIGS. 4A to 4D, the data equipment 66 is connected to the recording and/or reproducing apparatus 40. When the recording and/or reproducing apparatus 40 is set to a reproducing mode, it generates an optical signal LA of query digital audio data to be reproduced as a specific harmless sound, e.g., a beep of "PiPi" in a small sound volume. Then, as shown in FIG. 4A, the optical signal LA is transmitted through the cable 51 to the data equipment 66.

Figure 4B:
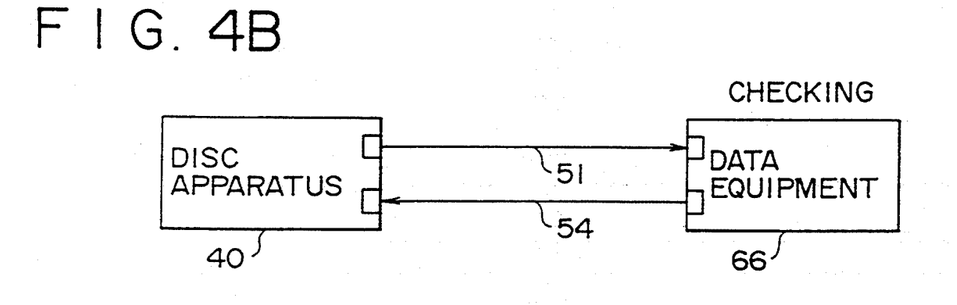

Then, as shown in FIG. 4B, the data equipment 66 checks whether or not the digital signal modulating the optical signal LA is the digital audio data to be reproduced as the beep of "PiPi".

Figure 4C:
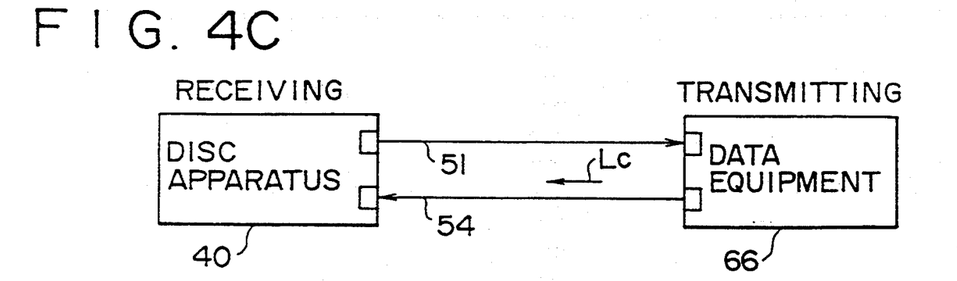

As the digital signal modulating the optical signal LA is the digital audio data to be reproduced as the beep of "PiPi" in this case, the data equipment 66 generates an optical signal LC of digital data indicating the permission of transmission, e.g., an optical signal of digital data to be reproduced as a beep of "PoPo". Then, as shown in FIG. 4C, the optical signal LC is supplied through the cable 54 to the recording and/or reproducing apparatus 40.

Then, the recording and/or reproducing apparatus 40 checks whether or not the digital signal modulating the optical signal LC is the signal indicating the permission of transmission of digital data.

Figure 4D:
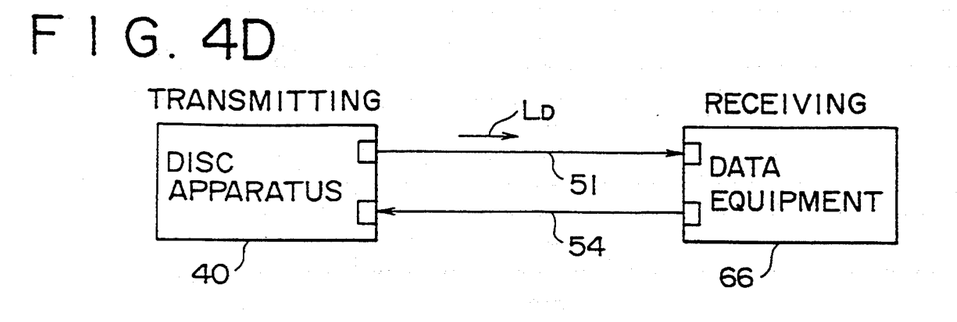

As the digital signal modulating the optical signal LC indicates the permission of transmission of digital data, the digital data is reproduced from the magneto-optical disc 1. Then, as shown in FIG. 4D, the digital data is converted into an optical signal LD, which is in turn transmitted through the cable 54 to the data equipment 66.

On the other hand, if the audio amplifier 63 is connected to the recording and/or reproducing apparatus 40, the audio amplifier 63 does not respond to the query optical signal LA transmitted from the apparatus 40 through the cable 51, that is, does not generate the optical signal LC indicating the permission of transmission of digital data. Accordingly, the recording and/or reproducing apparatus 40 decides that the equipment connected thereto is not the data equipment 66, and does not reproduce the digital data from the magneto-optical disc 1. Further, this condition is displayed on the display device 9.

In this manner, prior to reproduction of digital data recorded on the magneto-optical disc 1, the recording and/or reproducing apparatus 40 checks by handshaking whether the connected equipment is data equipment or audio equipment, and outputs the digital data only when the connected equipment is the data equipment.

If the connected equipment is the audio amplifier 63, the digital audio data of the query optical signal LA transmitted from the recording and/or reproducing apparatus 40 through the cable 51 as shown in FIG. 4A is reproduced as a beep from the speaker. However, the beep to be reproduced from the speaker is a beep of "PiPi" in a small sound volume, for example, so that there is no possibility that the speaker may be broken or the user's hearing may be adversely affected.

Although the digital recording and/or reproducing apparatus in the above preferred embodiment uses a magneto-optical disc as the recording medium, a phase change type of optical disc rather than the magneto-optical disc may be used as the recording medium according to the present invention. Further, the form of the recording medium is not limited to a disk-shaped recording medium, but it may be a tape-shaped recording medium. For example, a magnetic tape for the digital audio tape recorder/player mentioned above may be used as the recording medium. In addition, the optical connector may be replaced by a connector for a coaxial cable. Thus, various modifications may be made within the scope of the present invention.

What is claimed is;

1. A digital recording and/or reproducing apparatus using a recording medium, comprising:
    a first interface circuit for inputting and outputting digital audio data;
    a second interface circuit for inputting and outputting general digital data excluding said digital audio data;
    an input connector for inputting said digital audio data and said general digital data;
    an output connector for outputting said digital audio data and said general digital data; and
    recording and/or reproducing means for recording and/or reproducing said digital audio data and said general digital data;
    wherein in recording said digital audio data, said digital audio data input from said input connector is supplied to said first interface circuit, and said digital audio data output from said first interface circuit is supplied to said recording and/or reproducing means and recorded onto said recording medium by said recording and/or reproducing means;
    in reproducing said digital audio data, said digital audio data is reproduced from said recording medium by said recording and/or reproducing means, and said digital audio data reproduced is supplied to said first interface circuit and output from said output connector;
    in recording said general digital data, said general digital data input from said input connector is supplied to said second interface circuit, and said general digital data output from said second interface circuit is supplied to said recording and/or reproducing means and recorded onto said recording medium by said recording and/or reproducing means; and
    in reproducing said general digital data, said general digital data is reproduced from said recording medium by said recording and/or reproducing means, and said general digital data reproduced is supplied to said second interface circuit and output from said output connector.

2. A recording and/or reproducing apparatus according to claim 1, said apparatus further comprises a data type controller and switching means adapted to be controlled by said data type controller, said data type controller identifying a kind of data adapted to be recorded on said recording medium loaded in said apparatus, said data type controller operating said switching means according to a result of identification of said kind to selectively supply one of said digital audio data and said general audio data input from said input connector to one of said first interface circuit and said second interface circuit.

3. A recording and/or reproducing apparatus according to claim 2, wherein said data type controller reads data recorded in a management area of said recording medium loaded in said apparatus, and operates said switching means according to a result of reading of said data.

4. A digital recording and/or reproducing apparatus using a recording medium, comprising:
   a first interface circuit for inputting and outputting digital audio data;
   a second interface circuit for inputting and outputting general digital data excluding said digital audio data;
   an input connector for inputting said digital audio data and said general digital data;
   an output connector for outputting said digital audio data and said general digital data; and
   recording and/or reproducing means for recording and/or reproducing said digital audio data and said general digital data;
   wherein in recording said digital audio data, said digital audio data input from said input connector is supplied to said first interface circuit, and said digital audio data output from said first interface circuit is supplied to said recording and/or reproducing means and recorded onto said recording medium by said recording and/or reproducing means;
   in reproducing said digital audio data, said digital audio data is reproduced from said recording medium by said recording and/or reproducing means, and said digital audio data reproduced is supplied to said first interface circuit and output from said output connector;
   in recording said general digital data, said general digital data input from said input connector is supplied to said second interface circuit, and said general digital data output from said second interface circuit is supplied to said recording and/or reproducing means and recorded onto said recording medium by said recording and/or reproducing means; and
   in reproducing said general digital data, said general digital data is reproduced from said recording medium by said recording and/or reproducing means, and said general digital data reproduced is supplied to said second interface circuit and output from said output connector;
   a controller and switching means adapted to be controlled by said controller, said controller identifying a kind of said recording medium loaded in said apparatus and operating said switching means according to a result of identification of said kind to selectively supply one of said digital audio data and said general audio data input from said input connector to one of said first interface circuit and said second interface circuit;
   wherein said first and second interface circuits identify a data format of one of said digital audio data and said general digital data input from said input connector, and said controller operates said switching means according to a result of identification of said data format.

5. A digital recording and/or reproducing apparatus using a recording medium, comprising:
   a first interface circuit for inputting and outputting digital audio data;
   a second interface circuit for inputting and outputting general digital data excluding said digital audio data;
   an input connector for inputting said digital audio data and said general digital data;
   an output connector for outputting said digital audio data and said general digital data; and
   recording and/or reproducing means for recording and/or reproducing said digital audio data and said general digital data;
   wherein in recording said digital audio data, said digital audio data input from said input connector is supplied to said first interface circuit, and said digital audio data output from said first interface circuit is supplied to said recording and/or reproducing means and recorded onto said recording medium by said recording and/or reproducing means;
   in reproducing said digital audio data, said digital audio data is reproduced from said recording medium by said recording and/or reproducing means, and said digital audio data reproduced is supplied to said first interface circuit and output from said output connector;
   in recording said general digital data, said general digital data input from said input connector is supplied to said second interface circuit, and said general digital data output from said second interface circuit is supplied to said recording and/or reproducing means and recorded onto said recording medium by said recording and/or reproducing means; and
   in reproducing said general digital data, said general digital data is reproduced from said recording medium by said recording and/or reproducing means, and said general digital data reproduced is supplied to said second interface circuit and output from said output connector;
   a controller and switching means adapted to be controlled by said controller, said controller identifying a kind of said recording medium loaded in said apparatus and operating said switching means according to a result of identification of said kind to selectively supply one of said digital audio data and said general audio data input from said input connector to one of said first interface circuit and said second interface circuit;
   said controller reading data recorded in a management area of said recording medium loaded in said apparatus, and operating said switching means according to a result of reading of said data;
   said first and second interface circuits identifying a modulation type of one of said digital audio data and said general digital data, and said controller operating said switching means according to a result of identification of said modulation type.

6. A recording and/or reproducing apparatus according to claim 2, said apparatus further comprises input means connected to said data type controller, said input means designating a kind of one of said digital audio data and said general digital data to be recorded, and said recording and/or reproducing means records data indicating said kind into a management area of said recording medium.

7. A digital recording and/or reproducing apparatus using a recording medium, comprising:
   a first interface circuit for inputting and outputting digital audio data;

a second interface circuit for inputting and outputting general digital data excluding said digital audio data;

an input connector for inputting said digital audio data and said general digital data;

an output connector for outputting said digital audio data and said general digital data; and recording and/or reproducing means for recording and/or reproducing said digital audio data and said general digital data;

wherein in recording said digital audio data, said digital audio data input from said input connector is supplied to said first interface circuit, and said digital audio data output from said first interface circuit is supplied to said recording and/or reproducing means and recorded onto said recording medium by said recording and/or reproducing means;

in reproducing said digital audio data, said digital audio data is reproduced from said recording medium by said recording and/or reproducing means, and said digital audio data reproduced is supplied to said first interface circuit and output from said output connector;

in recording said general digital data, said general digital data input from said input connector is supplied to said second interface circuit, and said general digital data output from said second interface circuit is supplied to said recording and/or reproducing means and recorded onto said recording medium by said recording and/Or reproducing means; and in reproducing said general digital data, said general digital data is reproduced from said recording medium by said recording .and/or reproducing means, and said general digital data reproduced is supplied to said second interface circuit and output from said output connector;

wherein said first interface circuit comprises a digital audio interface standardized by IEC 958.

8. A digital recording and/or reproducing apparatus using a recording medium, comprising:

a first interface circuit for inputting and outputting digital audio data;

a second interface circuit for inputting and outputting general digital data excluding said digital audio data;

an input connector for inputting said digital audio data and said general digital data;

an output connector for outputting said digital audio data and said general digital data; and recording and/or reproducing means for recording and/or reproducing said digital audio data and said general digital data;

wherein in recording said digital audio data, said digital audio data input from said input connector is supplied to said first interface circuit, and said digital audio data output from said first interface circuit is supplied to said recording and/or reproducing means and recorded onto said recording medium by said recording and/or reproducing means;

in reproducing said digital audio data, said digital audio data is reproduced from said recording medium by said recording and/or reproducing means, and said digital audio data reproduced is supplied to said first interface circuit and output from said output connector;

in recording said general digital data, said general digital data input from said input connector is supplied to said second interface circuit, and said general digital data output from said second interface circuit is supplied to said recording and/or reproducing means and recorded onto said recording medium by said recording and/or reproducing means;

in reproducing said general digital data, said general digital data is reproduced from said recording medium by said recording and/or reproducing means, and said general digital data reproduced is supplied to said second interface circuit and output from said output connector; and in outputting one of said digital audio data and said general digital data from said output connector to equipment connected to said apparatus, said apparatus transmits a query signal to said equipment, and outputs one of said digital audio data and said general digital data from said output connector only when receiving a permission signal responsive to said query signal from said equipment.

9. A recording and/or reproducing apparatus according to claim 8, wherein said query signal comprises data indicating a specific sound.

10. A recording and/or reproducing apparatus according to claim 8, wherein said first interface circuit comprises a digital audio interface standardized by IEC 958.

* * * * *